(12) United States Patent
Guenter et al.

(10) Patent No.: US 9,160,081 B2
(45) Date of Patent: Oct. 13, 2015

(54) COMPONENT COMPOSITE OF TWO COMPONENTS USED FOR CURRENT CONDUCTION, METHOD FOR MANUFACTURING A COMPONENT COMPOSITE, AND USE OF A COMPONENT COMPOSITE

(71) Applicants: Friedhelm Guenter, Marbach (DE); Reiner Ramsayer, Rutesheim (DE)

(72) Inventors: Friedhelm Guenter, Marbach (DE); Reiner Ramsayer, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/094,318

(22) Filed: Dec. 2, 2013

(65) Prior Publication Data

US 2014/0151119 A1 Jun. 5, 2014

(30) Foreign Application Priority Data

Dec. 4, 2012 (DE) .......................... 10 2012 222 254

(51) Int. Cl.
*B60R 16/027* (2006.01)
*H01R 13/53* (2006.01)
*H01R 4/28* (2006.01)
*H01R 43/26* (2006.01)
*H01M 2/20* (2006.01)

(52) U.S. Cl.
CPC .................. *H01R 4/28* (2013.01); *H01M 2/202* (2013.01); *H01R 43/26* (2013.01); *Y10T 29/49208* (2015.01)

(58) Field of Classification Search
CPC ... G01D 4/002; H01M 2/1055; B60R 16/027; H01R 13/53
See application file for complete search history.

(56) References Cited

U.S. PATENT DOCUMENTS

| | | | |
|---|---|---|---|
| 3,057,246 A | 10/1962 | Brilmyer | |
| 4,702,655 A | 10/1987 | Kendall | |
| 5,315,755 A | 5/1994 | Fulbright et al. | |
| 5,369,248 A | 11/1994 | Dufour et al. | |
| 5,419,714 A * | 5/1995 | Nagamine | 439/364 |
| 2003/0016917 A1* | 1/2003 | Finona et al. | 385/62 |
| 2005/0130489 A1* | 6/2005 | Barnett | 439/475 |
| 2012/0077368 A1* | 3/2012 | Proeckl | 439/475 |

FOREIGN PATENT DOCUMENTS

DE    10 2009 002 135    10/2010

* cited by examiner

*Primary Examiner* — Gary Paumen
(74) *Attorney, Agent, or Firm* — Kenyon & Kenyon LLP

(57) ABSTRACT

A composite of two components which are used for current conduction, includes: a through opening formed in a first component; and a connection section of a second component which is insertable into the through opening in an installation direction so that a friction-locked connection in the form of a press-fit connection is formed at least regionally between the through opening and the connection section. The connection section and a holding section of the second component protrude beyond the first component in the area of the through opening in the installation direction in the installed state, and the holding section has at least one area for an installation aid which is reduced in cross section in relation to the cross-sectional area of the through opening.

10 Claims, 2 Drawing Sheets

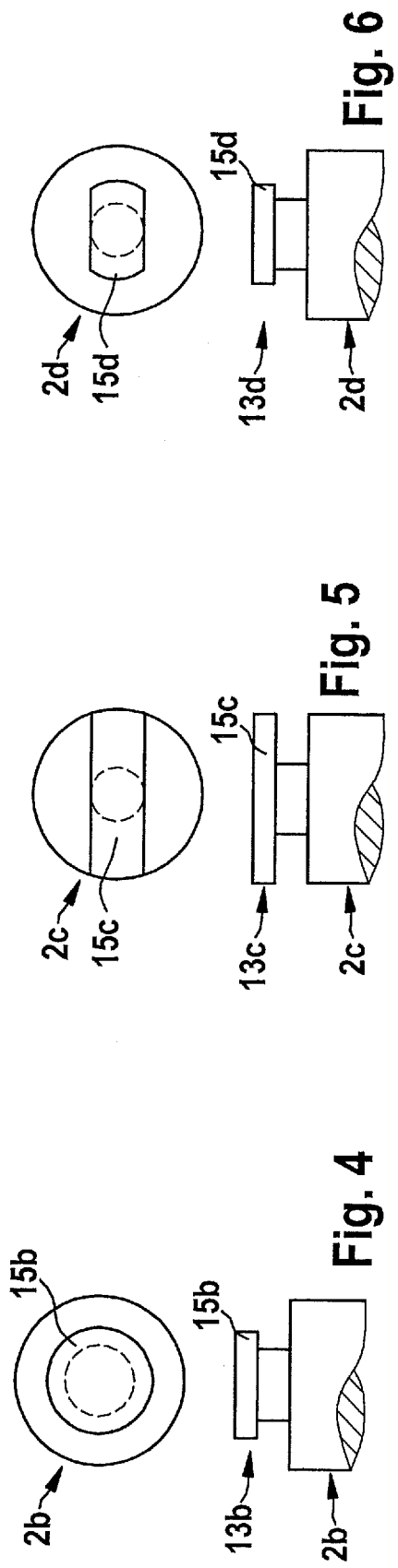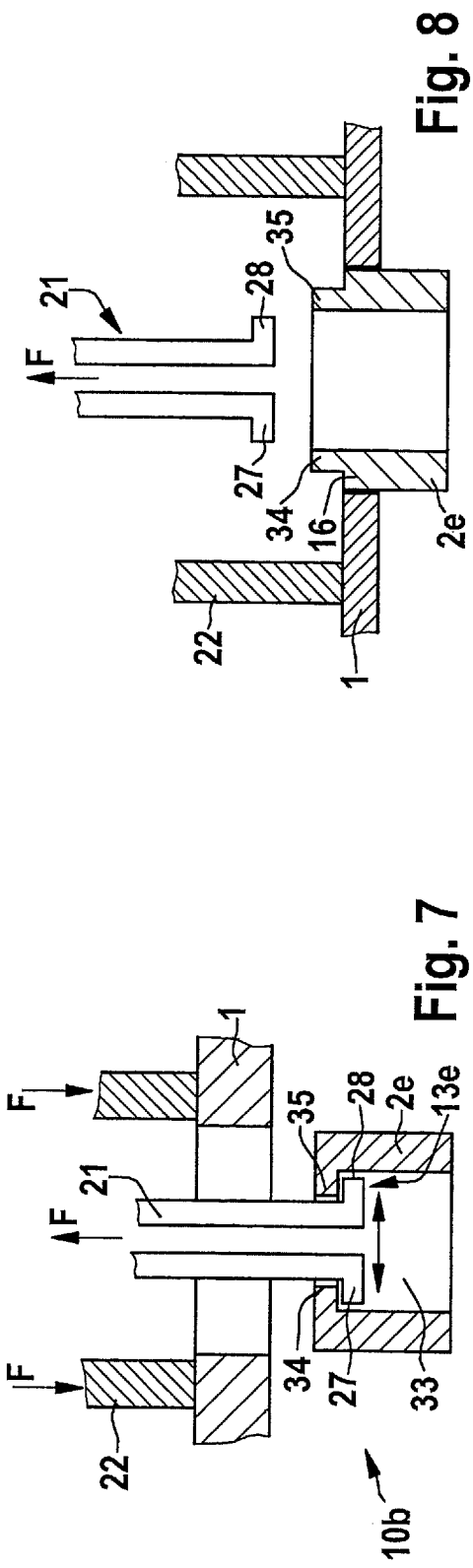

COMPONENT COMPOSITE OF TWO COMPONENTS USED FOR CURRENT CONDUCTION, METHOD FOR MANUFACTURING A COMPONENT COMPOSITE, AND USE OF A COMPONENT COMPOSITE

BACKGROUND OF THE INVENTION

1. Field of the Invention

The present invention relates to a component composite of two components used for current conduction, as well as to a method for manufacturing a component and the use of a component composite.

2. Description of the Related Art

A component composite known from Published German Patent Application document DE 10 2009 002 135 A1 is used for connecting two components, which are used for current conduction, with the aid of a press-fit connection. In the first component, for example, an electrical terminal lug or the like, a through opening is formed, into which a pin-shaped end of the second component is press-fitted. Such component composites have generally proven themselves in practice, in particular as long as the required press-fitting forces are not excessively high as a result of the dimensioning between the internal diameter of the through opening and the diameter of the second component in the connection section. However, if the press-fitting forces exceed a certain level, in the case of certain component geometries of the second component, it is often difficult to exert the required press-fitting forces on the first component. This is because the press-fitting in is carried out by applying a pressure force to the second component, and in the case of relatively thin or long second components, the risk exists of buckling of the second component or damage to the second component. In particular in the case of components which are composed of different materials and have different coefficients of thermal expansion, the problem additionally exists that to ensure sufficiently high connection forces or sufficiently low transfer resistances, relatively high compression forces must be generated over a large temperature range. Such components composed of different materials (for example, a material pair composed of copper and aluminum) occur in particular in the case of the electrical contacting of poles in lithium-ion batteries.

BRIEF SUMMARY OF THE INVENTION

The present invention is based on the object of providing a component composite in such a way that stress of the second component by pressure forces during the press-fitting of the connection section into the through opening of the first component is avoided. This object is achieved according to the present invention in a component composite in that a holding section of the connection section preferably protrudes beyond the first component in the installation direction in the area of the through opening in the installed state, and the holding section has at least one area, which is reduced in cross section in relation to the cross-sectional area of the through opening, for an installation aid. Such a design of the component composite or of the second component allows the connection section of the second component to be moved into an operative connection with the through opening of the first component by applying a tensile force. Therefore, according to the present invention, no pressure forces are exerted on the second component, which may result in damage to or buckling of the second component depending on the geometry of the second component.

To be able to use an installation aid, which has a relatively simple design and allows relatively simple manufacturing of the second component at the same time, in a preferred design embodiment of the holding section, it is provided that the holding section of the second component has two areas having different cross-sectional areas, a first area on the side facing toward the connection section, and a second area which preferably forms the frontal end of the second component, the second area having a greater cross-sectional area than the first area. An embodiment of the installation aid is thus made possible, in which it encloses the connection section in the area of the first area and is axially supported on the second area, in particular its one frontal face.

On the one hand, to avoid damage to or deformation of the components, in particular in the connection area between the components, and, on the other hand, to allow simplified handling of the installation aid, in which it does not have to be cumbersomely removed from contact with the second component after ending the actual installation process, for example, in another embodiment of the component composite, it is provided that the first area forms a predetermined breaking point, which shears off in the event a defined tensile force is exceeded on the second component in the installation direction. Thus, in particular in conjunction with a corresponding geometry between the two components, an installation may be made possible, in the case of which the connection section of the second component is initially introduced with a reduced force into the through opening of the first component to form the connection, and after completion of the actual installation process, the tensile force on the second component is increased, so that the end area of the second component shears off in a targeted way and thus releases the installation aid.

Such a predetermined breaking point may be formed, for example, in that the first area has a constant cross-sectional area. In this case, the required tensile force for shearing off the first area is determined by the size of the cross-sectional area, the shearing off fundamentally being able to be carried out in an arbitrary section of the first area.

In contrast, targeted shearing off of the first area may be achieved if a subarea which produces a notch effect is formed in the first area. Therefore, it may be provided, for example, that the first area has a constant, relatively large cross-sectional area with the exception of the subarea in which, for example, a radial circumferential ring groove is formed (in the case of a round cross-sectional area of the first area).

To make the installation of the component composite easier, and in particular to define an axial end position of the second component on the first component, it is provided in another embodiment of the present invention that the second component has an axial stop (in particular in the form of a shoulder) on the side facing away from the holding section, this stop rests against the first component in the installed state, and the axial stop has a cross-sectional area which at least regionally protrudes beyond the through opening.

A preferred field of use of the component composite is in the case of components which are composed of different materials. Such different materials typically also have different coefficients of thermal expansion, so that with the aid of the component composite according to the present invention, with relatively low mechanical stress of the second component during the installation process, relatively high joining or connection forces may be achieved between the two components.

In an alternative embodiment of the component composite, it is also possible that the second component has a cavity for the auxiliary tool, which is radially delimited by the wall of the component, and at least one holding area, which protrudes radially inward, for the auxiliary tool is situated on the frontal end of the cavity.

The present invention also includes a method for manufacturing a component composite according to the present invention, the connection section of the second component being introduced into the through opening of the first component by applying a tensile force in the installation direction. It is provided that during the installation, an ultrasonic vibration device is situated operationally connected to at least one of the two components. Such an installation method has the advantage that the installation forces may be reduced and, in addition, a specific integrally joined portion may be achieved in the case of the connection between the two components, whereby the electrical transfer resistance and the tendency to corrosion are possibly reduced.

The use of a component composite according to the present invention is preferred in the case of the electrical contacting of battery poles of lithium-ion cells. In particular, no additional connection elements, for example, screws or the like, or the use of additional welded connections are necessary to achieve the required connection forces in spite of the use of different materials for the battery poles and the components connected to the battery poles.

Further advantages, features, and details of the present invention result from the following description of preferred exemplary embodiments and on the basis of the drawings.

BRIEF DESCRIPTION OF THE DRAWINGS

FIG. 4 to FIG. 6 each show second components having different geometries in a top view and in a side view.

FIGS. 7 and 8 show another, modified component composite having a regionally sleeve-shaped second component before and after the joining procedure, respectively, in a side view in partial section.

DETAILED DESCRIPTION OF THE INVENTION

Figure 1:
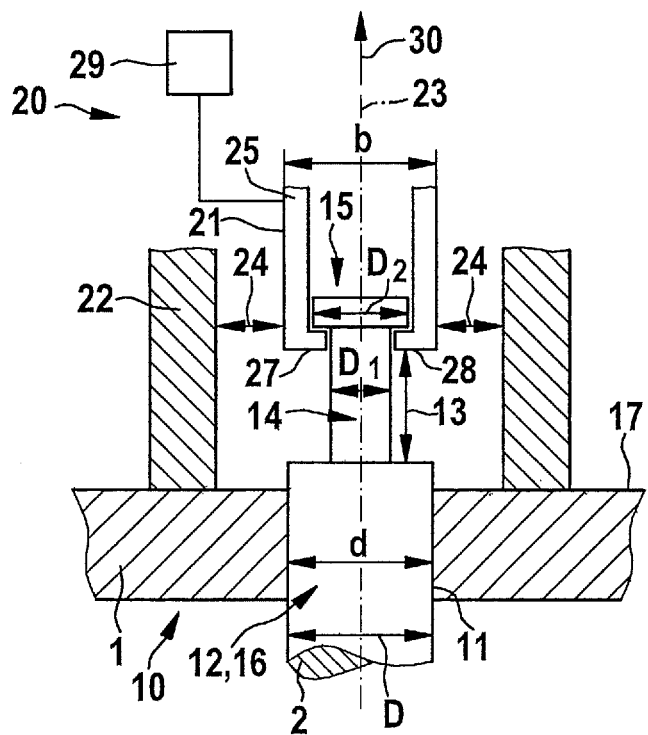
FIG. 1 shows a first component composite according to the present invention of two components used for current conduction in a side view in partial section.

Identical elements or elements with identical function are provided with identical reference numerals in the figures.

FIG. 1 shows a first component composite 10 according to the present invention of two components 1, 2, which are used for current conduction. Components 1, 2 may be, for example, components 1, 2 which are composed of identical material, or components 1, 2 which are composed of different materials. For the case in which components 1, 2 are composed of different materials, component 2 preferably has a greater coefficient of thermal expansion than component 1. As an example, but not restrictively, components 1, 2 are parts of an electrical connection in cells of a lithium-ion battery. Thus, component 1 may be a connection element composed of copper, for example, which connects two poles of the lithium-ion battery to one another, while component 2 is a pole of the lithium-ion battery composed of aluminum.

Component 1 is designed, in the drawing detail shown, as a flat component having a rectangular cross-sectional area. Component 1 has a receptacle for second component 2 in the form of a through opening 11. For example, through opening 11 has a diameter d, which is designed to be constant over the entire thickness or height of component 1. However, it is also within the scope of the present invention that through opening 11 is not designed to be round in cross section, but rather polygonal, for example.

Component 2 is designed to be pin-shaped in the detail of the drawing shown and has a cylindrical area 12 having a diameter D, diameter D being adapted to diameter d of through opening 11 in such a way that a press-fit connection is formed between the two components 1, 2, i.e., diameter D of component 2 is designed to be somewhat greater than diameter d of through opening 11 of component 1.

On one end area of component 2, it has a holding section 13 having two areas 14, 15 which axially adjoin one another.

First area 14 adjoins cylindrical area 12 and is also designed to be cylindrical, for example. Its diameter $D_1$ is less than diameter D of cylindrical area 12. On the side facing away from cylindrical area 12, first area 14 is adjoined by second area 15 having a diameter $D_2$, whose diameter $D_2$ is greater than diameter $D_1$, but less than diameter D of through opening 11.

In the position of the two components 1, 2 shown in FIG. 1, second component 2 assumes its installation final state, in which a subarea of cylindrical area 12 forms a connection section 16, which is situated in electrically conductive contact with through opening 11. On the side facing toward holding section 13, connection section 16 preferably protrudes slightly beyond top side 17 of first component 1; however, it may also be situated slightly below top side 17 of first component 1.

To be able to connect the two components 1, 2 to one another, an installation tool 20 is used. Installation tool 20 is at least composed of an installation aid 21 and a hold-down element 22, which radially encloses installation aid 21, for example. Hold-down element 22 is designed as sleeve-shaped in the simplest case and its front face facing toward first component 1 rests on top side 17 of component 1. Installation aid 21 is composed, for example, of two gripping elements 25, 26, which are movable in a direction perpendicular to longitudinal axis 23 in the direction of double arrows 24. End sections 27, 28 of gripping elements 25, 26, which face toward component 2, are bent over radially inward, so that they may be situated operationally connected to the front face of second area 15 of holding section 13, which faces toward cylindrical area 12. It is also essential that external distance b between the two gripping elements 25, 26 in the installation position shown in FIG. 1 is less than diameter d of through opening 11.

The installation of the two components 1, 2 with the aid of installation tool 20 is carried out as follows: Firstly, end sections 27, 28 of the two gripping elements 25, 26 are guided through (not shown) through opening 11, to be moved subsequently into operational connection with second component 2 from the side of first component 1 opposite to top side 17. This is carried out by grasping around second area 15 of holding section 13 with the aid of end sections 27, 28. Subsequently, installation aid 21 is moved in the installation direction identified by arrow 30, so that connection section 16 comes into contact with through opening 11 while forming the press-fit connection. The required counterforce when pulling connection section 16 of second component 2 through through opening 11 is applied by contact of hold-down element 22. After component 2 has reached the end position shown in FIG. 1, the two gripping elements 25, 26 may be moved away from one another, to move out of contact from second component 2. To detect the axial end position of second component 2 with respect to first component 1, a force-distance monitoring device (not shown) may advantageously be used. In addition, for example, the installation aid may be situated operationally connected to an ultrasonic vibration device 29, to reduce the required tensile or draw-in forces and/or to form a better electrical contact between the two components 1, 2.

Figure 2:
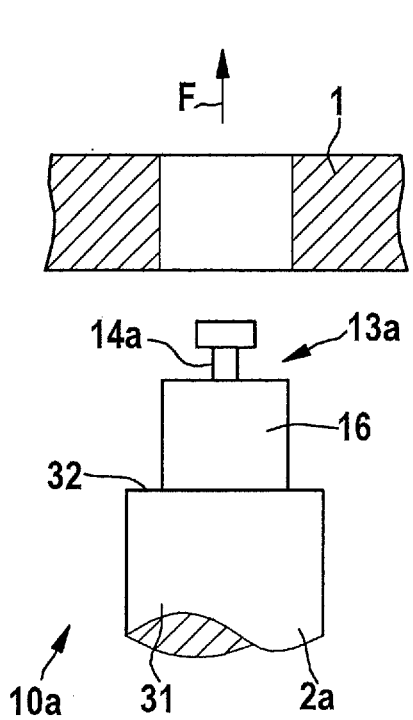
FIGS. 2 and 3 show a component composite, which is modified from FIG. 1, before and at the end of the connection of the two components, respectively, also in a side view in partial section.
Figure 3:
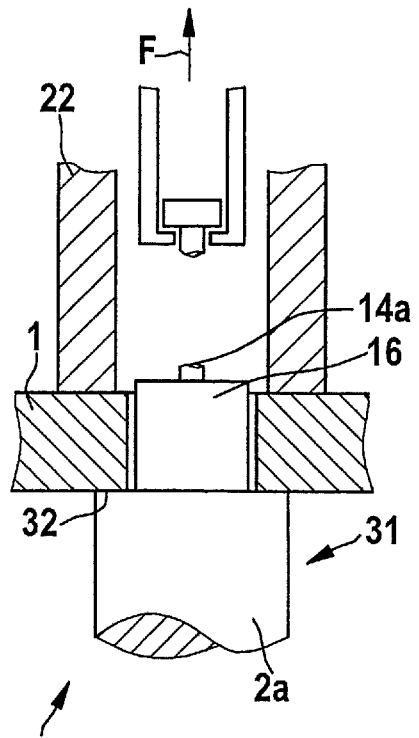

A component composite 10a which is modified in relation to FIG. 1 is shown in FIGS. 2 and 3, in which component 2a, in contrast to component 2, has an area 31 enlarged in diameter on the side facing away from holding section 13a, connection section 16 adjoining this area via a shoulder 32. Shoulder 32 is used, in the end position of the two components 1, 2a shown in FIG. 3, as an axial stop to delimit the axial movement of component 2a in relation to component 1. Holding section 13a has, in first area 14a, such a cross-sectional area that according to FIG. 3, holding section 13a is sheared off in first area 14a upon reaching the end position of second component 2a corresponding to FIG. 3. This is possible because shoulder 32 prevents further drawing of component 2a into through opening 11 of first component 1, and tensile force F on second component 2a is greater than the transmittable tensile force on second component 2a via first area 14a.

In an altered specific embodiment (not shown), it is also conceivable to equip first area 14a with a larger diameter or with a larger cross-sectional area and to design a predetermined breaking point in first area 14a, which allows targeted shearing off in first area 14a because of an increased notch effect, for example.

In modified components 2b, 2c, and 2d shown in FIGS. 4 through 6, holding section 13b, 13c, and 13d is designed differently in each case. Thus, second area 15b in holding section 13b is designed as circular, while second area 15c in holding section 13c is designed as web-shaped. Second area 15d in holding area 13d is also designed as web-shaped, but has a lesser width than second area 15c.

Finally, a further modified component composite 10b is shown before and after the connection of the two components 1, 2e in FIGS. 7 and 8, in which second component 2e is designed to be sleeve-shaped in the area shown. In particular, it has, on the side facing toward component 1, a cavity 33 radially delimited by the wall of component 2e, in which, for assembling second component 2e with component 1, end sections 27, 28, which protrude radially outward, of installation aid 21 may engage, holding areas 34, 35, which protrude radially inward, of second component 2e, which form holding section 13e, being engaged behind. At the end of the assembly process (FIG. 8) of second component 2e with first component 1, areas 34, 35 shear off when a specific tensile force F is exceeded, or deform in such a way that installation aid 21 may be drawn out of cavity 33.

Component composites 10, 10a, and 10b insofar described may be altered or modified in manifold ways, without deviating from the idea according to the present invention. In particular, component composites 10, 10a, and 10b are not to be restricted to round cross sections in the area of through opening 11 or connection section 16. Only the design of the claimed press-fit connection between the addressed areas is essential.

What is claimed is:

1. A component composite for current conduction, comprising:
   a first component having a through opening; and
   a second component having a connection section and a holding section, wherein the connection section is configured to be inserted into the through opening in an installation direction such that a friction-locked connection in the form of a press-fit connection is formed at least regionally between the through opening and the connection section in an installed state;
   wherein the connection section and the holding section protrude beyond the first component in an area of the through opening in the installation direction in the installed state, and wherein the holding section has at least one area for an installation aid which is reduced in cross section in relation to the cross-sectional area of the through opening, wherein the holding section is configured to be inserted with the installation aid through the through opening in the installation direction.

2. The component composite as recited in claim 1, wherein the holding section includes a first area and a second area having different cross-sectional areas, the first area being on a side facing toward the connection section, and wherein the second area forms a frontal end of the second component and has a greater cross-sectional area than the first area.

3. The component composite as recited in claim 2, wherein the first area forms a predetermined breaking point at which shearing off of the holding section occurs when a predefined tensile force on the second component in the installation direction is exceeded.

4. The component composite as recited in claim 3, wherein the first area has a constant cross-sectional area.

5. The component composite as recited in claim 3, wherein a subarea which produces a notch effect is provided in the first area.

6. The component composite as recited in claim 2, wherein:
   the second component has an axial stop on a side facing away from the holding section;
   the axial stop rests against the first component in the installed state; and
   the axial stop has a cross-sectional area which at least regionally protrudes beyond the through opening.

7. The component composite as recited in claim 3, wherein the first and second components are composed of different materials.

8. The component composite as recited in claim 3, wherein the component composite provide electrical contacting of battery poles in a lithium-ion battery.

9. A component composite for current conduction, comprising:
   a first component having a through opening; and
   a second component having a connection section and a holding section, wherein the connection section is configured to be inserted into the through opening in an installation direction such that a friction-locked connection in the form of a press-fit connection is formed at least regionally between the through opening and the connection section in an installed state;
   wherein the connection section and the holding section protrude beyond the first component in an area of the through opening in the installation direction in the installed state, and wherein the holding section has at least one area for an installation aid which is reduced in cross section in relation to the cross-sectional area of the through opening,
   wherein the second component has a cavity for the installation aid, the cavity being radially delimited by a wall of the second component, and wherein at least one holding area which protrudes radially inward for the installation aid is situated on a frontal end of the cavity.

10. A method for manufacturing a component composite, comprising:
    providing a first component having a through opening;
    providing a second component having a connection section and a holding section; and installing the connection section of the second component into the through opening of the first component in an installation direction by applying a tensile force such that a friction-locked connection in the form of a press-fit connection is formed at least regionally between the through opening and the connection section in an installed state, wherein, during the installation, an ultrasonic vibration device is situated in operational connection with at least one of the first and second components;

wherein the connection section and the holding section protrude beyond the first component in an area of the through opening in the installation direction in the installed state, and wherein the holding section has at least one area for an installation aid which is reduced in cross section in relation to the cross-sectional area of the through opening, wherein the holding section is inserted with the installation aid through the through opening in the installation direction.

* * * * *